Patented Jan. 2, 1945

2,366,485

UNITED STATES PATENT OFFICE 2,366,485

INORGANIC MOLDING COMPOSITIONS AND PRODUCTS PRODUCED THEREFROM

Edwin H. Brink, Drexel Hill, Pa., and Nicholas F. Arone, Trenton, N. J., assignors to General Electric Company, a corporation of New York No Drawing. Application December 18, 1941, Serial No. 423,518

4 Claims. (Cl. 106—85)

The present invention relates to inorganic molding compositions and to products produced therefrom. It relates more particularly to the manufacture of thermoset molded products from asbestos and orthophosphoric acid which are of especial use in the field of inorganic insulating materials, specifically, for arc chutes of air circuit breakers and other high temperature applications.

In the manufacture of inorganic insulating materials which are subject in use to high temperature conditions serious difficulty has been encountered in obtaining a material which can be produced in intricate shapes by hot-molding technique and which has the necessary mechanical and electrical properties to enable it to withstand the action of and heat produced by an electric arc. Materials such as asbestos-Portland cement mixtures are satisfactory to a certain degree but the comparatively high surface leakage inherent in these materials when used for example as arc chutes in air circuit breakers make it necessary to use expensive Mycalex facing plates on the arc chute inner surfaces in the region of the arcing contact structure. This is necessary in order to avoid voltage breakdown by creepage along the arc chute walls between the open contacts. Moreover, such materials, must be cold molded into shape and subsequently machined all of which is time consuming and expensive.

In accordance with the present invention it has been discovered that when certain types of asbestos fibers are treated with orthophosphoric acid of definite concentration range, a chemical reaction ensues to produce a composition which is capable of being hot molded directly to any shape or form by the usual hot-holding technique and producing in a very short time a thermoset product which is high in mechanical strength, low in water absorption and effectively resistant to heat and the action of the arc produced in circuit breaker operation. The product so produced also has good electrical properties and arc interrupting ability.

The reaction of the asbestos, it has been discovered, is singularly effective only with orthophosphoric acid in a concentration exceeding 60%, preferably in the range of 60 to 85%. The use of lower concentrations of phosphoric acid materially affects the physical properties of the product which is then inferior in electrical properties, has higher water absorption and additionally renders it difficult if not impractical to hot mold the product by the usual hot-molding procedure.

Moreover, the reaction appears to be specific to "serpentine variety" (chrysotile) asbestos and concentrated orthophosphoric acid. Mica, talc and amphibole asbestos for instance, appear to be essentially non-reactive to orthophosphoric acid. Mica-phosphoric acid compositions produced have had high water absorption even to the point of disintegration.

In producing the molded compositions of our invention the asbestos fibers are mixed with the concentrated orthophosphoric acid and molded under heat and pressure. One specific example of the procedure which may be followed in producing products according to the invention is given by way of illustration but not limitation:

50 parts by weight of 85% orthophosphoric acid are mixed with 100 parts by weight of short fiber chrysotile asbestos. The mixing may be performed in a water jacketed mixer of the Werner and Pfeidler type. The material is mixed for a short time, say, ten minutes, after which it is immediately placed in the hot mold. A pressure of three to six thousand pounds per square inch is applied with a temperature of between 100° C. and 200° C., preferably about 140° C. The piece is extracted hot after curing for the proper time, the usual period being about 3 to 10 minutes depending on the size, shape and thickness of the molded product. A product produced in accordance with this procedure will show a modulus of rupture of 5000 to 7000, a voltage stress of 150 to 250 volts per mil, and 3 to 5% water absorption.

The products of our invention are dense, rigid, stone-like materials. They are particularly useful as arc chutes for air circuit breakers and can be produced as such directly by hot molding and without machining of the molded product. Such arc chutes usually are of intricate shape, a side wall including in its structure several baffles and measuring about 18" x 20" x $\frac{3}{16}$". Since the products of the present invention show low surface leakage it is unnecessary to use expensive Mycalex facing plates on the arc chute inner surfaces in the region of the contact structure.

The products are not only produced by a simple hot molding technique but cure relatively fast to thermoset compositions and show but slight shrinkage in the mold. The molded products show excellent surface finish which obviates any further finishing or polishing operations. The flow characteristics are such as to permit the molding of intricate shapes. The products are machinable.

It is possible to produce not only molded compositions and products but also laminated products in various shapes and forms. Since the raw materials are relatively cheap the product is relatively inexpensive.

What we claim as new and desire to secure by Letters Patent of the United States is:

1. A hot-molding thermosetting composition comprising a reaction mixture of chrysotile asbestos and orthophosphoric acid of a concentration substantially exceeding 60%.

2. A thermoset molded product produced by reacting under heat and pressure a reaction mixture of chrysotile asbestos fibers and orthophosphoric acid of a concentration substantially exceeding 60%.

3. An arc chute for air circuit breakers comprising the heat and pressure reacted thermoset product of a reactable mixture of chrysotile asbestos fibers and phosphoric acid of a concentration substantially exceeding 60%.

4. The process of producing an inorganic thermoset molded product which comprises mixing chrysotile asbestos fibers reactable with orthophosphoric acid of a concentration substantially exceeding 60% and molding the mixture under heat and pressure.

EDWIN H. BRINK.
NICHOLAS F. ARONE.